(12) United States Patent
Kim et al.

(10) Patent No.: US 8,873,461 B2
(45) Date of Patent: Oct. 28, 2014

(54) PACKET TRANSMISSION/RECEPTION METHOD AND APPARATUS IN WIRELESS COMMUNICATION SYSTEM

(75) Inventors: Yun-Joo Kim, Suwon (KR); Jong-Ee Oh, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 725 days.

(21) Appl. No.: 13/025,950

(22) Filed: Feb. 11, 2011

(65) Prior Publication Data

US 2011/0199971 A1 Aug. 18, 2011

(30) Foreign Application Priority Data

Feb. 12, 2010 (KR) .................. 10-2010-0013536

(51) Int. Cl.
H04W 80/04 (2009.01)
H04W 88/06 (2009.01)
H04W 88/08 (2009.01)
H04W 28/06 (2009.01)

(52) U.S. Cl.
CPC ................. H04W 28/065 (2013.01)
USPC .......................................... 370/328

(58) Field of Classification Search
CPC .................................. H04W 28/065
USPC .......... 370/326–336, 210, 437, 219, 341–346
See application file for complete search history.

(56) References Cited

U.S. PATENT DOCUMENTS

| | | | |
|---|---|---|---|
| 7,324,605 B2 * | 1/2008 | Maltsev et al. | 375/299 |
| 7,352,718 B1 * | 4/2008 | Perahia et al. | 370/329 |
| 7,529,178 B1 | 5/2009 | Loc | |
| 7,826,473 B2 * | 11/2010 | Kwon et al. | 370/445 |
| 2005/0141420 A1 | 6/2005 | Li et al. | |
| 2005/0152473 A1 * | 7/2005 | Maltsev et al. | 375/299 |
| 2006/0152473 A1 * | 7/2006 | Johnson et al. | 345/107 |
| 2006/0280154 A1 * | 12/2006 | Kwon et al. | 370/338 |
| 2007/0153757 A1 | 7/2007 | Kim et al. | |
| 2007/0230493 A1 * | 10/2007 | Dravida et al. | 370/412 |
| 2009/0028271 A1 | 1/2009 | Aoki et al. | |

(Continued)

FOREIGN PATENT DOCUMENTS

| | | |
|---|---|---|
| KR | 2002-0049790 B1 | 6/2002 |
| KR | 10-2007-0061064 A | 6/2007 |

OTHER PUBLICATIONS 802.11 Working Group of the 802 Committee, "Wireless LAN Medium Access Control (MAC) and Physical Layer (PHY) specifications: Enhancements for Higher Throughput", Mar. 2006, IEEE P802.11n™ /D1.0.

Primary Examiner — Asad Nawaz
Assistant Examiner — Berhanu Belete

(57) ABSTRACT

A method for simultaneously transmitting packets having different lengths to two or more users in a wireless communication system includes: generating the packets which are to be transmitted to the respective users; and simultaneously transmitting the generated packets to the respective users. Each of the packets contains information on the position of a symbol to which a tail field of the packet belongs, and the information on the position of the symbol to which the tail field belongs includes at least one of the maximum symbol number of the packet, the symbol number of transmission data of the packet, positional information of a last aggregated MAC protocol data unit (A-MPDU) subframe, and positional information of a null delimiter.

16 Claims, 9 Drawing Sheets

(56) References Cited

U.S. PATENT DOCUMENTS

| | | | |
|---|---|---|---|
| 2010/0014463 A1* | 1/2010 | Nagai et al. | 370/328 |
| 2010/0201196 A1* | 8/2010 | Spurlin et al. | 307/66 |
| 2010/0329215 A1* | 12/2010 | Wilson et al. | 370/331 |
| 2011/0170627 A1* | 7/2011 | Kwon et al. | 375/295 |
| 2012/0033614 A1* | 2/2012 | Sampath et al. | 370/328 |

* cited by examiner

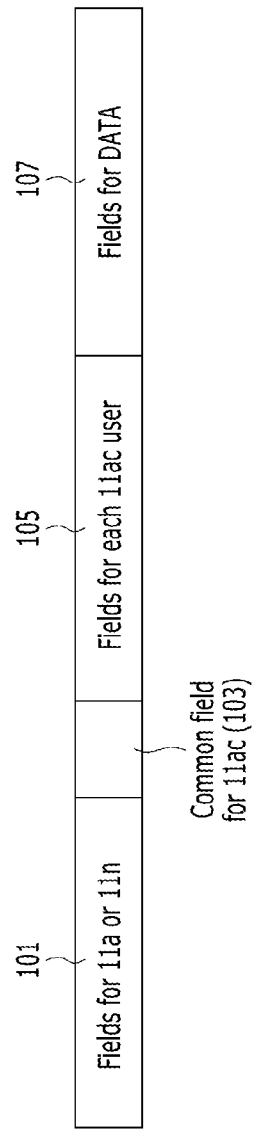
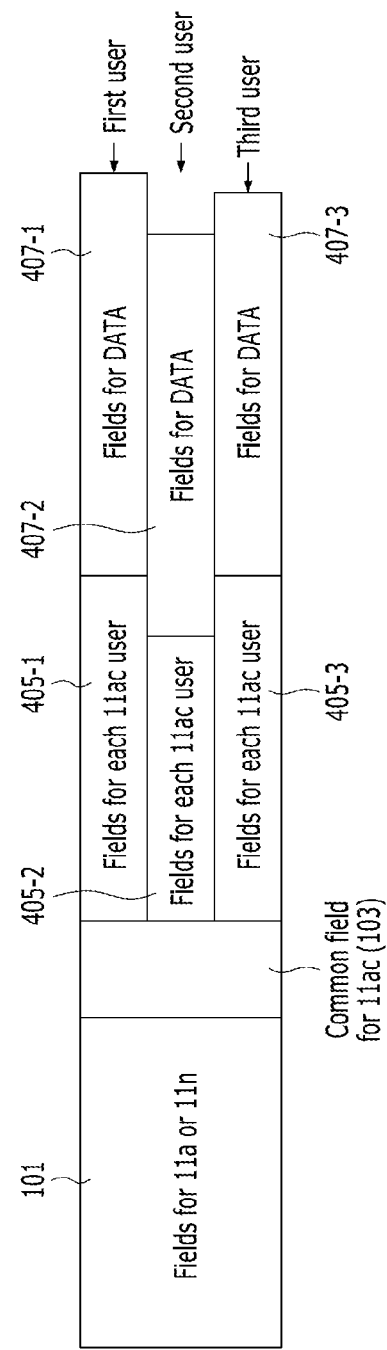
FIG. 3
FIG. 4

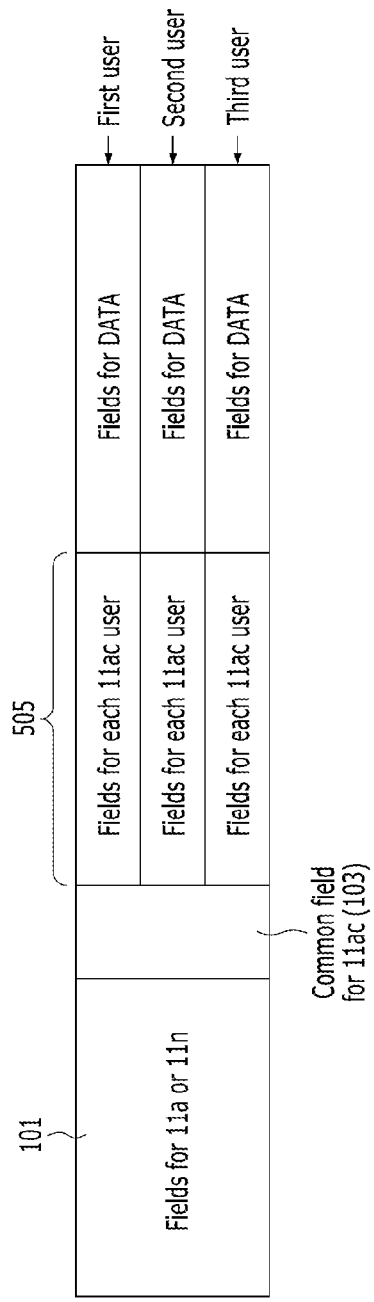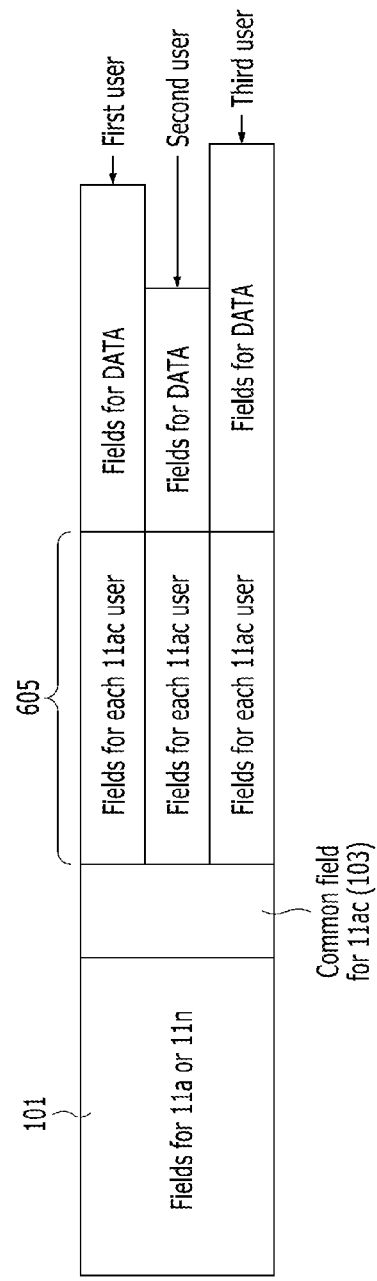

PACKET TRANSMISSION/RECEPTION METHOD AND APPARATUS IN WIRELESS COMMUNICATION SYSTEM

CROSS-REFERENCE(S) TO RELATED APPLICATIONS

The present application claims priority of Korean Patent Application No. 10-2010-0013536 filed on Feb. 12, 2010, which is incorporated herein by reference in its entirety.

BACKGROUND OF THE INVENTION

1. Field of the Invention

Exemplary embodiments of the present invention relate to a packet transmission/reception method and apparatus in a wireless communication system.

2. Description of Related Art

While a variety of high-capacity multimedia services have been vitalized, the performance of a wireless communication system is not high. Since multiple users share a wireless resource, the transmission speed of the wireless service, which is felt by the users, becomes significantly low. Accordingly, a variety of techniques have been researched to increase the performance of the wireless communication system for multiple users. For example, the bandwidth may be increased to expand the wireless resource shared by multiple users, or a specific beam may be implemented for communication with each user while a wireless resource having the same bandwidth is used.

A medium access control (MAC) protocol of the wireless communication system is operated on the basis of CSMA/CA (Carrier Sense Multiple Access/Collision Avoidance). Therefore, the MAC protocol contains a problem of resource waste which occurs during a channel contention process. In order to solve such a problem, an enhanced MAC protocol defined by the IEEE 802.11 working group 'e' has proposed burst transmission in which multiple MAC protocol data units (MPDU) are transmitted at a short inter-frame space (SIFS) during a transmission opportunity (TXOP) time, when a transmission opportunity for a wireless resource is acquired, and a block ACK frame for the multiple MPDUs is received. Furthermore, the IEEE 802.11 working group 'n' has defined an aggregated MAC service data unit (MSDU) (hereinafter, referred to as A-MSDU) and an aggregated MPDU (A-MPDU). In this case, MSDUs and MPDUs may be respectively aggregated without an IFS, and then transmitted through one contention process for a wireless resource.

According to the development trend of the above-described wireless communication system, the IEEE 802.11 working group 'ac' has defined that the maximum performance of 1 Gbps should be supported at and a MAC service access point (SAP) of an access point (AP) in a wireless communication system including one AP and two stations (STA), and the maximum performance of 500 Mbps is required at a MAC SAP of an STA for a point-to-point environment, in order to implement a high-speed wireless communication system. Furthermore, as the requirements of the high-performance wireless communication system, each AP and STA needs to support compatibility with the existing wireless communication system (IEEE 802.11a/n system).

In the wireless communication system, a transmitter (AP or STA) acquires a wireless channel, and then transmits data having a byte-unit length and information required for transmitting the data together. A structure including the data and the information required for transmitting the data may be referred to as a packet. At this time, the information required for transmitting the data is defined as a promised value in a structure named 'header'.

FIG. 1 shows the structure of a packet defined in the IEEE 802.11a. Data having a constant byte-unit length and a variety of fields are configured together and then transmitted to a receiver, and the receiver receives the data by using information acquired from the respective fields. The variety of fields include short and long training fields 11 and 12, a signal field 13, a service field 14, and tail & pad fields 16, which contain information required by a physical layer (PHY). At this time, the data included in a data field 15 as well as the service field 14 and the tail & pad fields 16 has a variable length within the maximum range.

FIG. 2 shows the structure of a packet having a mixed format, which may be received by both of the IEEE 802.11a system and the IEEE 802.11n system. Referring to FIG. 2, as the packet having a mixed format includes legacy fields 21 such as a legacy-short training field (L-STF), a legacy-long training field (L-LTF), and a legacy-signal field (L-SIG), the IEEE 802.11a system may acquire information required for receiving data. Furthermore, the packet includes fields 23 for the IEEE 802.11n system from an HT-SIG field such that the IEEE 802.11n system may acquire information required for receiving data.

As the packet structures as shown in FIGS. 1 and 2 are defined in the IEEE 802.11a and 802.11n wireless communication systems, there is a demand for a packet structure which coincides with a high-performance wireless communication system capable of simultaneously transmitting different packets to multiple users, respectively. For example, the high-performance wireless communication system may include a wireless communication system based on multi-user multi-input multi-output (MU-MIMO) technology.

SUMMARY OF THE INVENTION

An embodiment of the present invention is directed to a method and apparatus capable of simultaneously transmitting packets having different lengths to multiple users in order to satisfy requirements by a high-performance wireless communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for simultaneously transmitting packets having different lengths to two or more users in a wireless communication system includes: generating the packets which are to be transmitted to the respective users; and simultaneously transmitting the generated packets to the respective users. Each of the packets contains information on the position of a symbol to which a tail field of the packet belongs, and the information on the position of the symbol to which the tail field belongs includes at least one of the maximum symbol number of the packet, the symbol number of transmission data of the packet, positional information of a last A-MPDU subframe, and positional information of a null delimiter.

In accordance with another embodiment of the present invention, a method for receiving a packet from a transmitter which simultaneously transmits packets having different lengths to two or more users in a wireless communication system includes: receiving the packet containing information on the position of a symbol to which a tail field of the packet belongs; and processing the packet by using the information on the position of the symbol to which the tail field of the received packet belongs. The information on the position of the symbol to which the tail field belongs includes at least one of the maximum symbol number of the packet, the symbol number of transmission data of the packet, positional information of a last A-MPDU subframe, and positional information of a null delimiter.

In accordance with another embodiment of the present invention, an apparatus for simultaneously transmitting packets having different lengths to two or more users in a wireless communication system includes: a packet generation unit configured to generate the packets to be transmitted to the respective users; and a transmission unit configured to simultaneously transmit the generated packets to the respective users. Each of the packets contains information on the position of a symbol to which a tail field of the packet belongs, and the information on the position of the symbol to which the tail field belongs includes at least one of the maximum symbol number of the packet, the symbol number of transmission data of the packet, positional information of a last A-MPDU subframe, and positional information of a null delimiter.

In accordance with another embodiment of the present invention, an apparatus for receiving a packet from a transmitter which simultaneously transmits packets having different lengths to two or more users in a wireless communication system includes: a reception unit configured to receive the packet containing information on the position of a symbol to which a tail field of the packet belongs; and a packet processing unit configured to process the packet by using the information on the position of the symbol to which the tail field of the received packet belongs. The information on the position of the symbol to which the tail field belongs includes at least one of the maximum symbol number of the packet, the symbol number of transmission data of the packet, positional information of a last A-MPDU subframe, and positional information of a null delimiter.

BRIEF DESCRIPTION OF THE DRAWINGS

FIG. 1 is a diagram showing the structure of a packet defined in the IEEE 802.11a.

FIGS. 3 to 8 and 11 are diagrams the structures of packets in a wireless communication system in accordance with exemplary embodiments of the present invention.

DESCRIPTION OF SPECIFIC EMBODIMENTS

Figure 1:
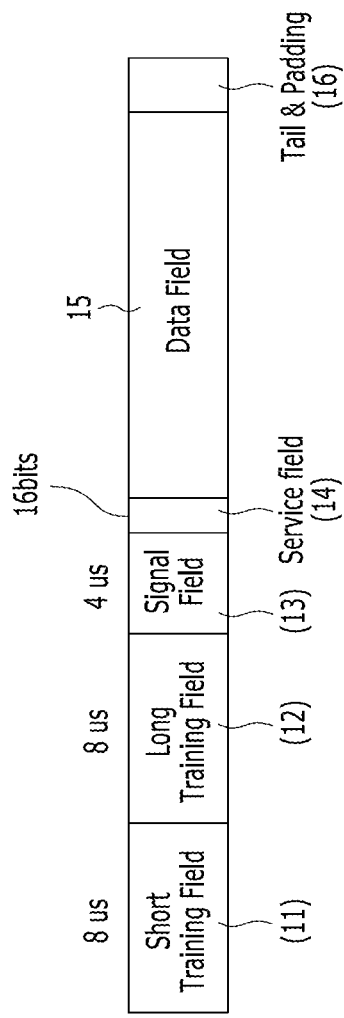

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Exemplary embodiments of the present invention provide a method and apparatus which simultaneously transmits packets having different lengths to multiple users in a wireless communication system. For convenience of explanation, the embodiments of the present invention will be described on the basis of a packet structure which is to be used in a wireless communication system of the IEEE 802.11 ac. The wireless communication system may be referred to as a very high throughput (VHT) system. Therefore, the embodiments of the present invention are not limited to the name of a specific wireless communication system. Therefore, the method and apparatus in accordance with the embodiments of the present invention may support a variety of environments such as a multi-channel environment and a wireless LAN environment of a MU-MIMO system. In the multi-channel environment, data are transmitted and received by using frequencies different from each other.

FIG. 3 is a diagram showing the structure of a packet for a wireless communication system of the IEEE 802.11 ac in accordance with an embodiment of the present invention. The packet of FIG. 3 has a mixed format for the compatibility with 802.11 a/n, and includes a field 101 for 802.11 a/n, fields 103 and 105 for 802.11 ac, and a data field 107. The fields 103 and 105 for 802.11 ac include a common field 103 for 802.11 ac and a field 105 for each user of 802.11 ac. Here, the field 101 for 802.11 a/n includes information which is to be transferred to each user of 802.11 a/n, the common field 103 for 802.11 ac includes information which is to be commonly transferred to multiple users of 802.11 ac, the field 105 for each user of 802.11 ac includes information which is to be transmitted to each user of 802.11 ac, and the data field 107 includes data which is to be transmitted to each user. The field 105 for each user of 802.11 ac and the data field 107 may be provided in a different format to each user. For example, the configurations and/or lengths of sub-fields of the fields 105 and 107 may be set to be different for each user.

The field 105 for each user of 802.11 ac may include a training field (referred to as 'VHT training field') and a signal field (referred to as 'VHT signal field'), as in 802.11 a/n. Depending on whether a long training field (referred to as 'VHT LTF') of the VHT training field is resolvable or non-resolvable, the field 105 for each user of 802.11 ac and/or the data field 107 may be configured in a different manner for each user. FIG. 4 shows an example in which the VHT LTF is non-resolvable. In FIG. 4, fields 405-1, 405-2, and 405-3 for multiple users of 802.11 ac have different lengths from each other. Furthermore, data fields 407-1, 407-2, and 407-3 for the respective users have different data lengths from each other. FIGS. 5 and 6 show an example in which the VHF LTF is resolvable. In FIGS. 5 and 6, fields 505 and 605 for multiple users of 802.11 ac have the same length. FIG. 5 shows an example in which data fields have the same length for the respective users, and FIG. 6 shows an example in which data fields have different lengths for the respective users.

Referring to FIGS. 3 to 6, the fields for VHT in the packet structure of 802.11 ac include fields for transmitting common information to each user and fields for transmitting different information to each user. Therefore, there is a demand for a method which is capable of efficiently controlling the respective fields and properly informing each user of different information.

The IEEE 802.11 legacy MAC protocol of the wireless communication system transmits data by the MPDU including an MSDU, when a transmission opportunity for a wireless resource is acquired. The IEEE 802.11 enhanced MAC protocol transmits data by the TXOP. The HT (high-throughput)-MAC protocol of the IEEE 802.11n transmits data by the A-MPDU. In this embodiment, when acquiring a transmission opportunity, a transmitter may simultaneously transmit frames to multiple users, based on the MU-MIMO technology. This is defined as an MU-MIMO transmission unit (MU-MIMO TX unit) of the VHT-MAC protocol.

Furthermore, the VHT MAC protocol in accordance with the embodiment of the present invention may transmit a single MSDU or MPDU. However, since the VHT MAC protocol should support performance equal to or higher than that of the HT-MAC protocol, the VHT MAC protocol may transmit an A-MPDU within data to be transmitted. The method proposed in this embodiment may be supported in both of the resolvable example and the non-resolvable example, which have been described above.

Figure 7:
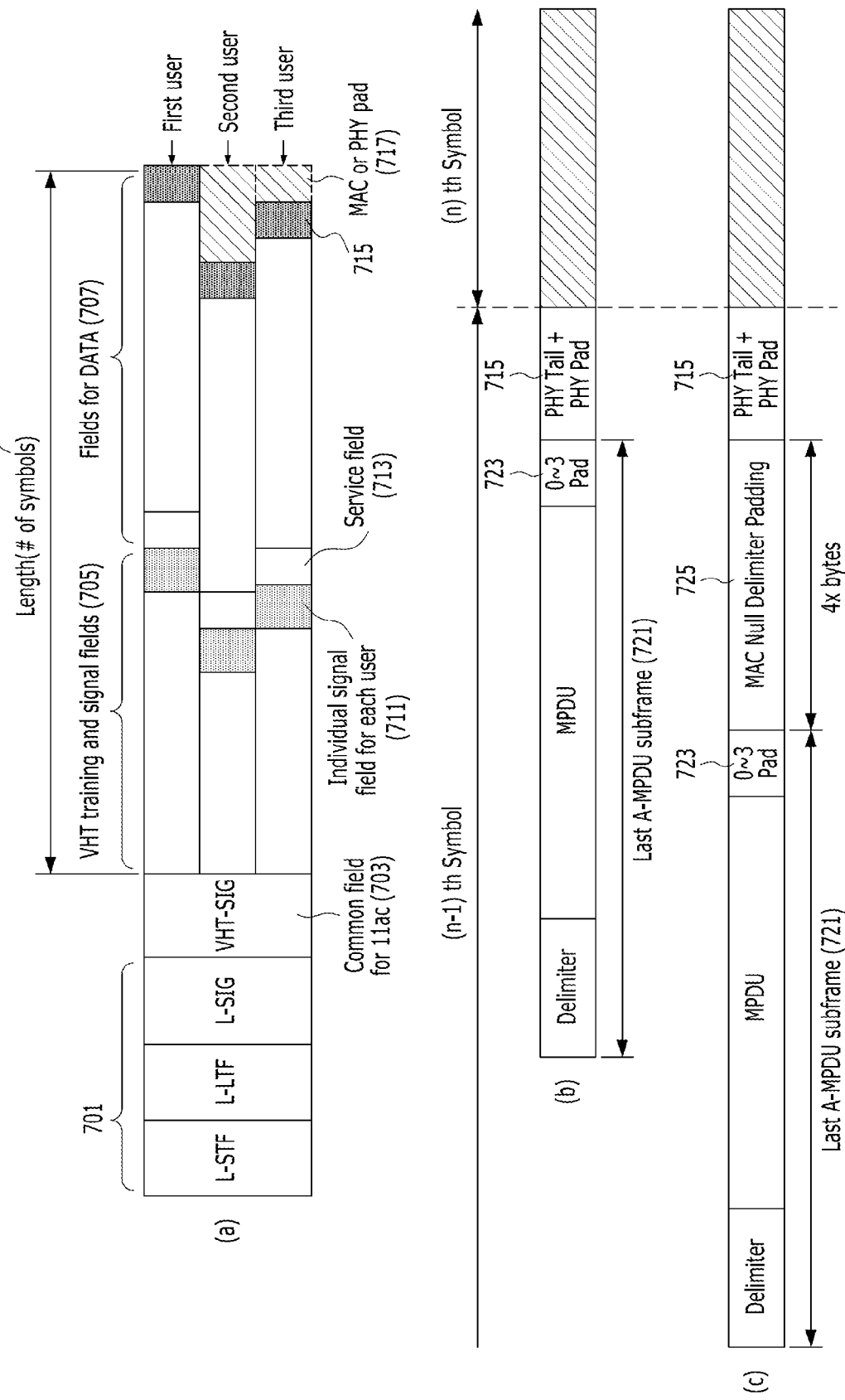

FIG. 7 is a detailed diagram of the packet structure shown in FIG. 3, showing such a structure that simultaneously transmits packets having different lengths to multiple users. The packet of FIG. 7 includes a field 701 or 101 for legacy, a VHT-SIG field 703 or 103, and VHT training and signal fields 705 or 105, and a data field 707 or 107. The VHT-SIG field 703 or 103 contains information which is to be commonly transferred to multiple users of the VHT system. The VHT training and signal fields 705 or 105 include a training field and a signal field 711 for each user.

At this time, information on the maximum length 709 of the packet which is simultaneously transmitted to multiple users may be transferred to the respective users. The maximum length 709 of the packet may be represented by the unit of byte or symbol. In particular, since the length of the VHT training and signal fields 705, the length of the data field 707, and/or a transmission modulation coding scheme (MCS) may differ for each user, the maximum length 709 of the packet may be represented by the number of symbols. That is, since a transmission MCS transmitted to each user is different, the maximum length 709 may be based on the transmission time. Therefore, the maximum length 709 of the packet may represent the maximum number of symbols required for transmitting the VHT training and signal fields 705 and the data field 707, which may differ for each user. In FIG. 7, since the number of symbols required for transmitting the VHT training and signal fields 705 and the data field 707 for a first user is the largest, the symbol number is decided as the maximum length 709. The information on the maximum length of the packet may be contained in the VHT-SIG field 703, for example. In a modified example, information on the transmission MCS for each user may be transferred together, or the maximum length of the packet may be represented by the unit of byte, when the same MCS is used for all users.

A variety of transmission information applied to each user may be contained in the individual signal field 711 existing in the VHT training and signal fields 705 transferred to each user. The individual signal field 711 may be positioned at the end portion of the VHT training and signal fields 705, as shown in FIG. 7. In a modified example, however, the individual signal field 711 may be positioned at the front or middle portion of the VHT training and signal fields 705.

Furthermore, a service field 713 of the PHY is positioned at the front portion of the data field 707 for data transferred to each user. The position of the service field 713 is identical to those of the service fields 14 and 25 shown in FIGS. 1 and 2. Like the service field 25 of the packet having an HT mixed format of FIG. 2, the service field 713 of FIG. 7 has 16 bits of '0' before being scrambled by a scrambler, and is then reset to a pseudo-random nonzero seed value. At this time, the scrambler nonzero seed value is configured as nine bits, and the remaining seven bits serve as reserved bits.

Figure 2:
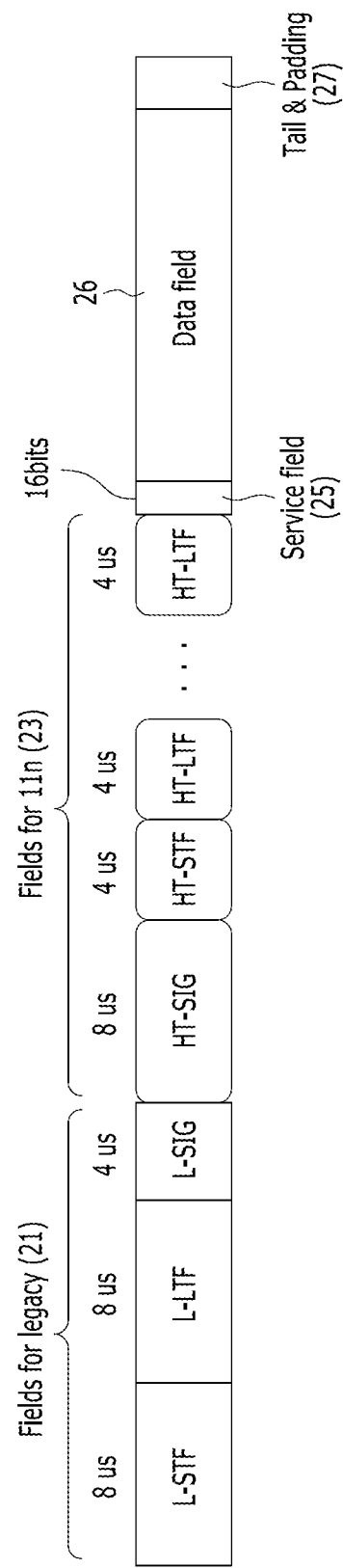
FIG. 2 is a diagram showing the structure of a packet having a mixed form for the IEEE 802.11a system and the IEEE 802.11n system.

Meanwhile, the tail & pad fields 16 and 27 shown in FIGS. 1 and 2 follow the end of significant data transmitted to each user, and are the last information of the data fields 15 and 26, which is required for receiving and processing the packet in the PHY of the user. For example, the tail field may be used to return a convolution encoder to a zero ('0') state, and the pad field may be used as dummy data for controlling the minimize size of a frame.

As described above, however, when the maximum length information of the packet is transferred as the number of symbols and the byte-unit length information of significant data transmitted to each user is not provided, the PHY of each user cannot recognize the position of the last byte of significant data within the packet received by the PHY. Therefore, the correct position of the tail & pad fields cannot be recognized.

Figure 8:
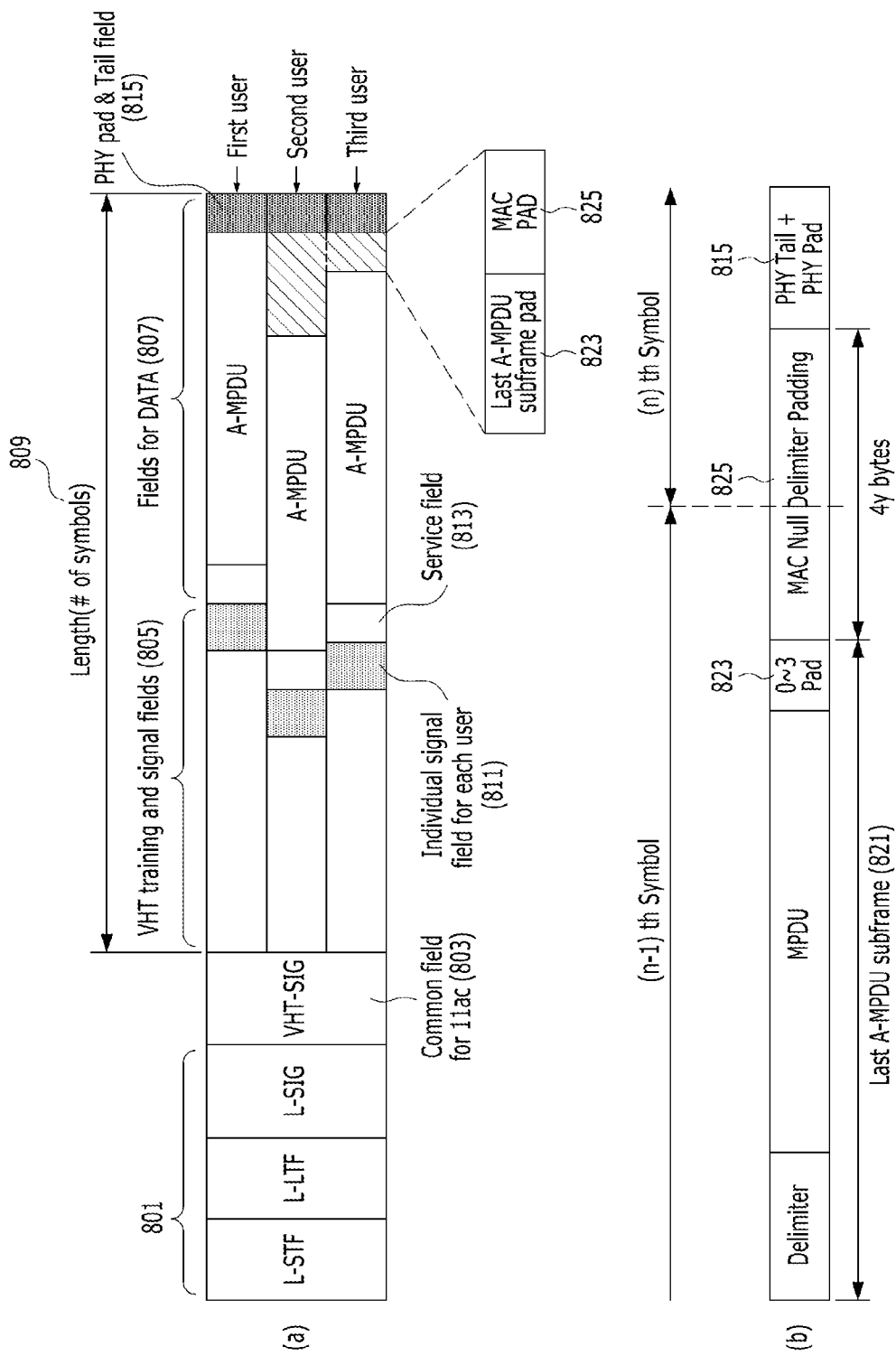

As shown in FIG. 8, however, when PHY pad & tail fields 815 are positioned at the end of the last symbol (n-th symbol), the PHY of each user may recognize the last symbol (n-th symbol) through the maximum length information 809 of the packet, and may find the PHY pad & tail fields positioned at the end portion of the last symbol (n-th symbol). Desirably, the tail field may be positioned next to the PHY pad field, different from the IEEE 802.11 a/n. In this case, when the PHY of each user receives a packet and processes the received packet by the unit of symbol, the process may be easily performed. Accordingly, the PHY of each user may easily find the tail field as the last field in the last symbol (n-th symbol). In a modified example, however, the PHY pad & tail fields may be configured in such a manner that the tail field is positioned before the PHY pad field, as in the IEEE 802.11 a/n. In this case, the PHY of each user may find the tail field after finding the last byte of the last symbol (n-th symbol), for example.

Specifically, in order to position the PHY pad & tail fields 815 at the end portion of the last symbol (n-th symbol) as shown in FIG. 8, a MAC pad 825 may be interposed between significant data and the PHY pad & tail fields 815 within the last symbol. Hereinafter, this configuration will be described in detail. First, an A-MPDU frame defined in the IEEE 802.11n includes one or more A-MPDU subframes, and each of the A-MPDU subframes includes a delimiter, an MPDU, and 0~3 pad. However, the last A-MPDU subframe of 802.11n does not include 0~3 pad 823. Here, 0~3 pad refers to 0~3 byte pad. On the contrary, in the VHT system, 0~3 pad 823 is added to the last A-MPDU subframe 821 such that all A-MPDU subframes including the last A-MPDU subframe may be processed by the unit of four bytes. In FIG. 8, 0~3 pad 823 is represented by 'last A-MPDU subframe pad' 823. That is, the VHT system may maintain four-byte alignment for all A-MPDU subframes including the last A-MPDU subframe. Next to the last A-MPDU subframe 821, a MAC pad 825 including one or more null delimiters of which the MPDU length is '0' is added, and the PHY pad & tail fields 815 are added to the end portion of the last symbol (n-th symbol).

In the VHT frame padding method in which the PHY pad & tail fields 815 of each user is positioned at the end portion of the last symbol (n-th symbol) as shown in FIG. 8, the position of the tail field may be recognized, but the reception of the last symbol (n-th symbol) should be completed even though all users completely receive significant data. Therefore, depending on a difference between the maximum symbol length represented by the length 809 of FIG. 8 and the symbol length up to the significant data of each user, a reception overhead may occur. For example, when data are simultaneously transmitted to the first and second users, the data to be transmitted to the first user may include 50 symbols, and the data to be transmitted to the second user may include 10 symbols. In this case, 40 symbols for the second user should be filled with the MAC pad 825. However, since the second user may receive only 10 symbols but should receive 50 symbols, a reception overhead occurs.

Figure 11:
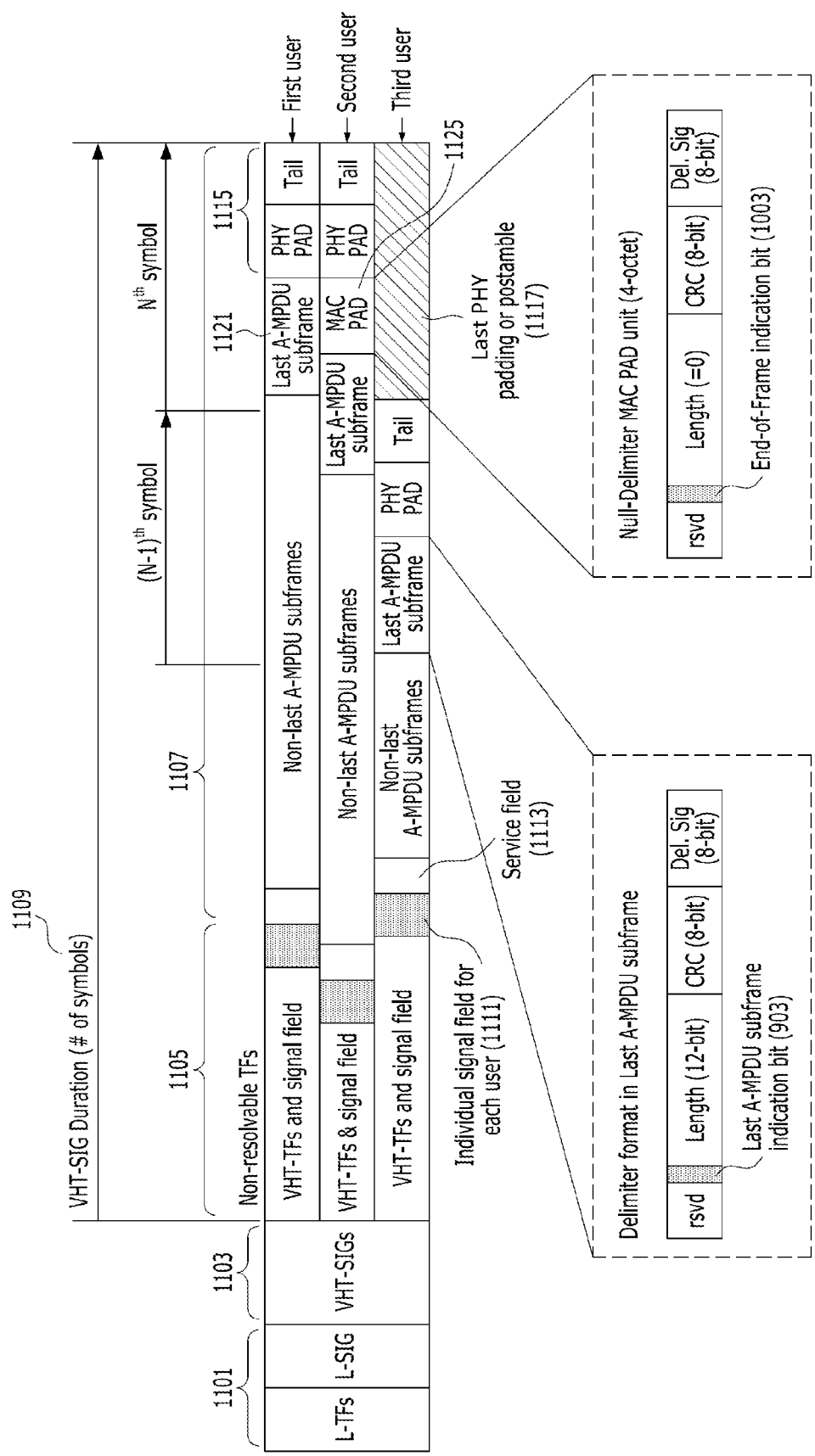

Hereinafter, when a packet transmitter in a wireless communication system simultaneously transmits packets having different lengths to multiple users, a method capable of recognizing the position of a tail in the side of each user and reducing the above-described reception overhead will be described with reference to FIGS. 7 and 11.

As described above, when the transmitter transmits predetermined data, the transmitter simultaneously transmits information required for transmitting the data. At this time, since the predetermined data is contained in the MPDU of each A-MPDU subframe, the last data to be transmitted is contained in the last A-MPDU subframe 721 or 1121. In order to reduce a reception overhead, the PHY pad & tail fields 715 or 1115 need to be positioned next to the last A-MPDU subframe 721 or 1121. However, the PHY pad & tail field 715 or 1115 should be positioned at the end portion of a certain symbol such that the PHY of each user may recognize the position of the tail. Therefore, the configuration of the fields may differ. When the PHY pad & tail fields 715 or 1115 following the last A-MPDU subframe 721 or 1121 is positioned at the end portion of the corresponding symbol as in FIG. 7 (b) and the first and third users of FIG. 11, the PHY pad & tail fields 715 or 1115 may positioned next to the last A-MPDU subframe 721 or 1121. On the other hand, when the PHY pad & tail fields 715 or 1115 are not positioned at the end portion of the corresponding symbol as in FIG. 7 (c) and the second user of FIG. 11 even though the PHY pad & tail fields 715 or 1115 are positioned next the last A-MPDU subframe 721 or 1121, a MAC pad 725 or 1125 including one or more null delimiters of which the MPDU length is '0' may be interposed therebetween. At this time, when the PHY pad & tail fields 715 or 1115 are positioned at the end portion of the symbol, the smallest MAC pad 725 or 1125 may be used. That is, as shown in FIG. 7 (c), the smallest MAC pad 725 or 1125 may be used to position the PHY pad & tail fields 715 or 1115 in the (n−1)-th symbol, not in the n-th symbol. However, the configuration is not limited thereto.

In this embodiment of the present invention, significant data refers to data which is to be actually transmitted to a corresponding user, and may be referred to as 'transmitted data'. The significant data may indicate a structure up to the last A-MPDU subframe 721 or 1121, the MAC pad 725 or 1125 including null delimiters, which is added between the last A-MPDU subframe 721 or 1121 and the PHY pad & tail fields 715 and 1115, or the PHY pad & tail fields.

In the PHY pad & tail fields 715 or 1115, the tail field may be positioned next to the PHY pad field such that the position of the tail may be easily recognized. In a modified example, however, the PHY pad & tail fields may be configured in such a manner that the PHY pad field is positioned next to the tail field, as in the IEEE 802.11 a/n.

First to third methods which will be described below may be individually used or combined in various manners.

<First Method>

The transmitter transmits information on the maximum length 709 or 1109 of the packet and information on the length of significant data to be transmitted to each user, which may be represented by symbol numbers M and N, respectively. When the symbol number of significant data transmitted to each user is N, the tail is positioned at an N-th symbol. For example, when a packet to be transmitted to a certain user is configured as shown in FIG. 7 (b) or (c), the symbol number N of significant data to be transmitted to the corresponding user corresponds to N−1. Therefore, the tail is positioned at an (N−1)-th symbol.

Specifically, the transmitter informs multiple users of the information on the maximum symbol number M of the packet. For example, the information on the symbol number M may be contained in the VHT-SIG field 703 or 1103 which is a common field for the VHT system. Furthermore, the transmitter informs each user of the information on the symbol number N of significant data to be transmitted to the user. At this time, the information may be represented by N or M−N where M−N is an offset from the maximum symbol number M. In both cases, the information may be expressed by using an arbitrary a-bit and has a range of $2^a$. Alternatively, in order to minimize an overhead in representing the information on the symbol number N, the transmitter may indicate only information on whether or not the maximum symbol number M is equal to the symbol number N of significant data to be transmitted to the user. For example, '0' may indicate that the maximum symbol number M is equal to the symbol number N, and '1' may indicate that the maximum symbol number M is different from the symbol number N. This information may be used together with the representation of 'N' or 'M−N'.

Now, several methods for representing 'N' or 'M−N' will be proposed. In a first method, 'N' or 'M−N' may be contained in the individual signal field 711 or 1111 by which user-specific transmission information may be transferred. In a second method, 'N' or 'M−N' may be transferred by using reserved bits of the service field 713 or 1113 within the data field 707 or 1107. That is, the reserved bits of the service field configured as first two bytes of a PHY service data unit (PSDU) may be used. In a third method, reserved bits of the individual signal field 711 or 1111 and the service field 713 or 1113 may be used together. Since the number of remaining bits of the individual signal field 711 or 1111 for transferring user-specific transmission information (for example, MCS) in addition to 'N' or 'M−N' may not be sufficient or the number of reserved bits of the service field 713 or 1113 may be too small to represent 'N' or 'M−N', predetermined bits of the two fields 711 or 1111 and 713 or 1113 are used together so as not to impose a burden on any one side. Furthermore, the information on whether or not M is equal to N may also be represented by using any one or more of the reserved bits of the individual signal field 711 or 1111 and the service field 713 or 1113.

As described above, when the reserved bits of the individual signal field 711 or 1111 and the service field 713 or 1113 are used, the following modification may be considered. Referring to FIGS. 1 and 2, the data field 707 or 1107 is a data field of PHY protocol data unit (PPDU), and may include the two-byte service field 713 or 1113, an A-MPDU having the maximum 65535 bytes, and the PHY pad & tail fields 715 or 1115. At this time, while only one service field 713 or 1113 containing a scrambler seed value exists in one PPDU, each delimiter and MPDU composing the A-MPDU contains a cyclic redundancy checking (CRC) value. However, when the scrambler seed value of the service field 713 or 1113 is not normally transferred even though the CRC process is performed several times at the MAC level, subsequent data are not normally decoded. Therefore, considering that the MCS of the training & signal fields 705 or 1105 has a lower error rate than that of the data field 707 or 1107, the scrambler seed value of the service field 713 or 1113 may be contained in the individual signal field 711 or 1111 to strengthen protection. As such, in order to strengthen the protection of the scrambler seed value, the scrambler seed value may be written in the individual signal field 711 or 1111. In addition, the scrambler seed value may be duplicated in the service filed 713 or 1113, in order to support the compatibility with users following the existing structure. Furthermore, the information of 'N', the information of 'M−N', and the information on whether or not M is equal to N are represented by using any one or more of the reserved bits of the individual signal field 711 or 1111 and the service field 713 or 1113. The detailed descriptions thereof are the same as described above.

Meanwhile, when the structure of a packet is configured as shown in FIG. 8, the PHY pad & tail fields may be recognized only by the maximum symbol number M of the packet. Furthermore, when significant data is set up to the MAC pad 825 configured as null delimiters or the PHY pad & tail field 815, the PHY pad & tail fields may be recognized by using M and/or N according to the above-described first method.

In the second and third methods to be described below, the position of a symbol to which the PHY pad & tail fields belong is indicated by using reserved bits of a delimiter.

<Second Method>

Figure 9:
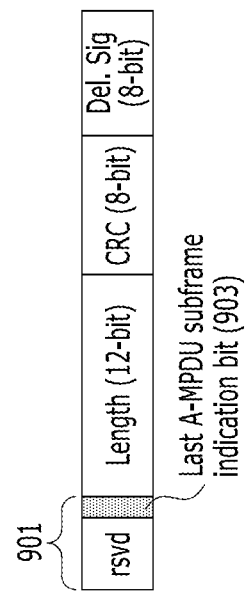
FIG. 9 is a diagram showing a delimiter of a last A-MPDU subframe in accordance with an embodiment of the present invention.

In the second method, reserved bits of a delimiter of the last A-MPDU subframe 721 or 1121 are used. Referring to FIG. 9, the delimiter of the last A-MPDU subframe 721 or 1121 may include reserved bits 910, a length field having the length information of the MPDU, a CRC field, and a delimiter signature field. The transmitter may indicate that the corresponding A-MPDU subframe is the last A-MPDU subframe 721 or 1121, by using a part of the reserved bits 901 of the delimiter of the last A-MPDU subframe 721 or 1121. In the configuration as shown in FIG. 9, a last A-MPDU subframe indication bit 903 may be used, and the position thereof may be varied. In a modified example, information M on the maximum length 709 or 1109 of the packet may be transferred to multiple users, even when the second method is used.

Each user recognizes that the corresponding A-MPDU subframe is the last A-MPDU subframe 721 or 1121, through the last A-MPDU subframe indication bit 903. Accordingly, the user may find a symbol to which the last PHY information 715 or 1115 belongs. Therefore, the last PHY information 715 or 1115 of the corresponding symbol may be processed as the PHY pad & tail fields. This method is needed when the last PHY information 715 or 1115 is positioned next to the last A-MPDU subframe 721 or 1121 without the MAC pad 725 or 1125.

<Third Method>

Figure 10:
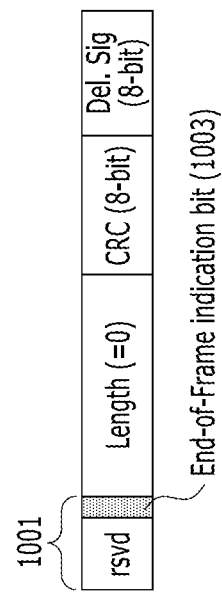
FIG. 10 is a diagram showing a null delimiter in accordance with the embodiment of the present invention.

In the third method, reserved bits of a null delimiter composing the MAC pad 725 or 1125 are used. Referring to FIG. 10, the null delimiter has an MPDU length of '0', and may include reserved bits 1001, a CRC field, and a delimiter signature field. The transmitter indicates the end of a frame, by using a part of the reserved bits 1001 of the null delimiter. In the configuration as shown in FIG. 10, an end-of-frame indication bit 1003 may be used, and the position thereof may be varied. In a modified example, the transmitter may inform multiple users of the information M on the maximum length 709 or 1109 of the packet, even when the third method is used.

Each user recognizes the end of the frame through the end-of-frame indication bit 1003. Accordingly, the user may find a symbol to which the last PHY information 715 or 1115 belongs. Therefore, the last PHY information 715 or 1115 of the corresponding symbol may be processed as PHY pad & tail fields.

Figure 12:
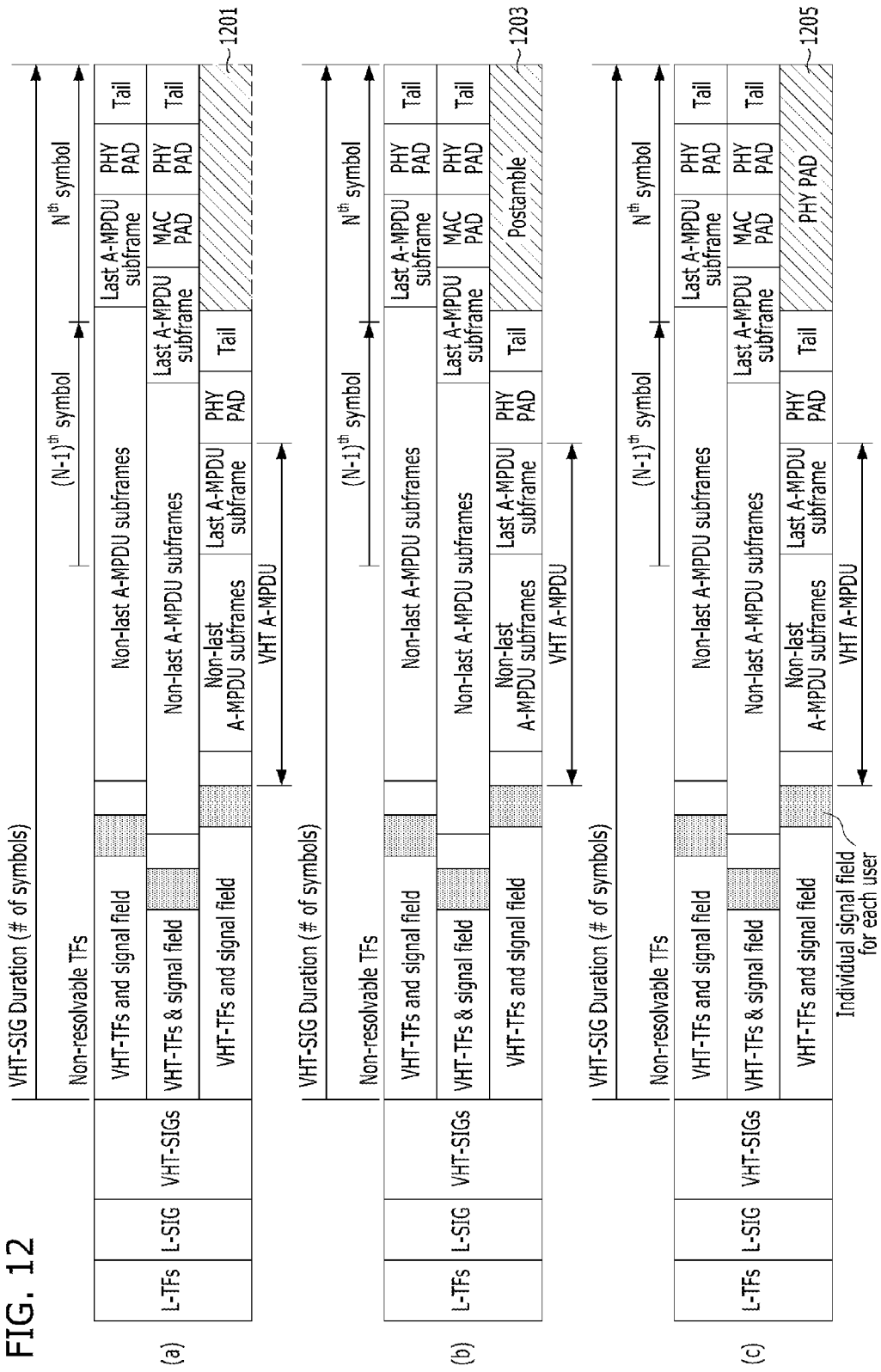
FIG. 12 is a diagram explaining a method of processing remaining symbols in accordance with the embodiment of the present invention.

Hereinafter, a method of processing remaining symbols after the symbol to which the PHY pad & tail fields belong will be described with reference to FIG. 12. Referring to FIG. 12 (*a*), the transmitter may not transmit remaining symbols in order to relieve the interference with other users (1201). Furthermore, referring to FIG. 12 (*b*), the remaining symbols may be used as post-amble including different PHY information and then transmitted (1203), in order to improve the performance of data transmission and reception. Furthermore, referring to FIG. 12 (*c*), the remaining symbols may be used as a PHY pad and then transmitted (1205).

Figure 13:
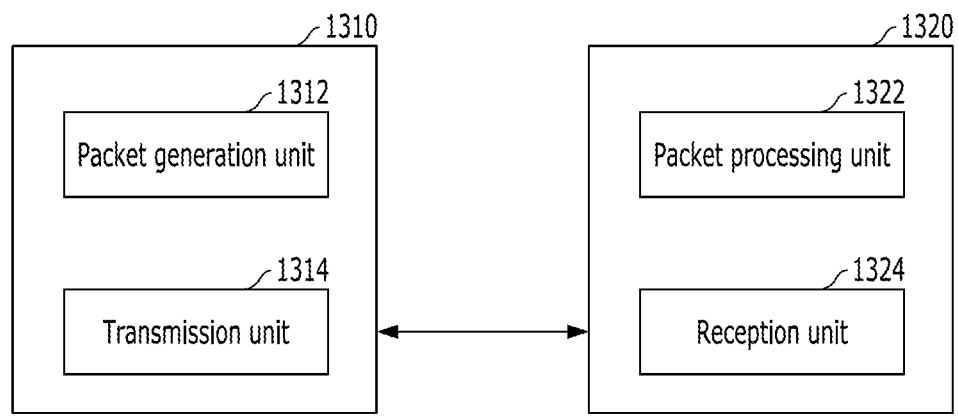
FIG. 13 is a diagram illustrating the configurations of a packet transmitter and a packet receiver in accordance with another embodiment of the present invention.

Hereinafter, the configurations of a packet transmitter 1310 capable of simultaneously transmitting packets having different lengths to two or more users according to the above-described methods and a packet receiver 1320 capable of receiving and processing such a packet from the packet transmitter 1310 will be described with reference to FIG. 13. Here, the duplicated descriptions as described above will be omitted. An AP and STA of a wireless communication system may serve as a packet transmitter or packet receiver.

The packet transmitter 1310 includes a packet generation unit 1312 and a transmission unit 1314.

The packet generation unit 1312 is configured to generate different packets which are to be transmitted to multiple users according to the above-described method.

The transmission unit 1314 is configured to simultaneously transmit the packets generated by the packet generation unit 1312 to multiple users, for example, two or more packet receivers 1302.

The packet receiver 1320 includes a reception unit 1324 and a packet processing unit 1322.

The reception unit 1324 is configured to receive a packet from the packet transmitter 1310, and the packet processing unit 1322 is configured to process the packet received by the reception unit 1324 according to the above-described method.

In accordance with the embodiments of the present invention, packets having different lengths may be simultaneously transmitted to multiple users in a variety of high-performance wireless communication systems such as an MU-MIMO system. Depending on services, the multi-antenna technology for supporting multiple users may be configured dynamically with the method in accordance with the embodiments of the present invention. Therefore, various services may be supported, and the performance improvement effect may be expected.

While the present invention has been described with respect to the specific embodiments, it will be apparent to those skilled in the art that various changes and modifications may be made without departing from the spirit and scope of the invention as defined in the following claims.

What is claimed is:

1. A method for simultaneously transmitting packets having different lengths to two or more users in a wireless communication system, the method comprising:

generating an aggregated medium access control (MAC) protocol data unit (A-MPDU) including a common field and the packets for the users, wherein the common field includes information to be commonly transferred to the users, the packets being transmitted to respective users; and transmitting the A-MPDU including the common field and the packets to the users, the packets being simultaneously transmitted to the respective users, wherein each of the packets includes symbols and information for recognizing a position of a symbol to which a tail field of each of the packets belongs, wherein the information for recognizing the position of the symbol to which the tail field belongs includes at least one of a maximum symbol number of the packets, a symbol number of transmission data of each of the packets, positional information of a last A-MPDU subframe, and positional information of a null delimiter according to a configuration of each of the packets, wherein the maximum symbol number of the packets is included in the common field, and wherein the maximum symbol number of the packets comprises a maximum symbol number required for transmitting training fields, signal fields, and data fields of the two or more users.

2. The method of claim 1, wherein the tail field is positioned within the last byte of the symbol to which the tail field belongs.

3. The method of claim 1, wherein the symbol number of the transmission data of each of the packets comprises a symbol number required for transmitting data up to the last A-MPDU subframe of the packets, the null delimiter, or the tail field.

4. The method of claim 1, wherein the symbol number of the transmission data of each of the packets is indicated by using any one or more of a service field and a signal field of the packets.

5. The method of claim 1, wherein the positional information of the last A-MPDU subframe is indicated in a reserved bit within a delimiter of the last A-MPDU subframe of the packets.

6. The method of claim 1, wherein the positional information of the null delimiter is indicated in a reserved bit of the null delimiter of the packets.

7. A method for receiving transmission data from a transmitter which simultaneously transmits packets having different lengths to two or more users in a wireless communication system, the method comprising:

receiving the packets included in an aggregated medium access control (MAC) protocol data unit (A-MPDU) that includes a common field and the packets, the common field including information to be commonly transferred to the users;

securing information for recognizing a position of a symbol to which a tail field of each of the packets belongs; and processing the packets by using the information for recognizing the position of the symbol to which the tail field of each of the packets belongs, wherein the information for recognizing the position of the symbol to which the tail field belongs comprises at least one of a maximum symbol number of the packets, the symbol number of transmission data of each of the packets, positional information of a last A-MPDU subframe, and positional information of a null delimiter according to a configuration of each of the packets, wherein the maximum symbol number of the packets is included in the common field, and wherein the maximum symbol number of the packets comprises a maximum symbol number required for transmitting training fields, signal fields, and data fields of the two or more users.

8. The method of claim 7, wherein the tail field is positioned within the last byte of the symbol to which the tail field belongs.

9. The method of claim 7, wherein the symbol number of the transmission data of each of the packets comprises a symbol number required for transmitting data up to the last A-MPDU subframe of the packets, the null delimiter, or the tail field.

10. The method of claim 7, wherein the symbol number of the transmission data of each of the packets is indicated by using any one or more of a service field and a signal field of the packets.

11. The method of claim 7, wherein the positional information of the last A-MPDU subframe is indicated in a reserved bit within a delimiter of the last A-MPDU subframe of the packets.

12. The method of claim 7, wherein the positional information of the null delimiter is indicated in a reserved bit of the null delimiter of the packets.

13. An apparatus for simultaneously transmitting packets having different lengths to two or more users in a wireless communication system, the apparatus comprising:

a packet generation unit configured to generate, using a processor, an aggregated medium access control (MAC) protocol data unit (A-MPDU) including a common field and the packets, the common field including information to be commonly transferred to the users, the packets being transmitted to respective users; and a transmission unit configured to transmit the A-MPDU including the common field and the packets to the users, the packets being simultaneously transmitted to the respective users, wherein each of the packets includes symbols and information for recognizing a position of a symbol to which a tail field of each of the packets belongs, wherein the information for recognizing the position of the symbol to which the tail field belongs includes at least one of a maximum symbol number of the packets, a symbol number of transmission data of each of the packets, positional information of a last A-MPDU subframe, and positional information of a null delimiter according to a configuration of each of the packets, wherein the maximum symbol numbers of the packets is included in the common field, and wherein the maximum symbol number of the packets comprises a maximum symbol number required for transmitting training fields, signal fields, and data fields of the two or more users.

14. The apparatus of claim 13, wherein the tail field is positioned in the last byte of the symbol to which the tail field belongs.

15. An apparatus for receiving transmission data from a transmitter which simultaneously transmits packets having different lengths to two or more users in a wireless communication system, the apparatus comprising:

a reception unit configured to receive the packets and information for recognizing the position of a symbol to which a tail field of each of the packets belongs, the packets being included in an aggregated medium access control (MAC) protocol data unit (A-MPDU) that includes a common field and the packets, the common field including information to be commonly transferred to the users; and a packet processing unit configured to process, using a processor, the packets by using the information for recognizing the position of the symbol to which the tail field of each of the packets belongs, wherein the information for recognizing the position of the symbol to which the tail field belongs includes at least one of a maximum symbol number of the packets, a symbol number of transmission data of each of the packets, positional information of a last A-MPDU subframe, and positional information of a null delimiter according to a configuration of each of the packets, wherein the maximum symbol numbers of the packets is included in the common field, and wherein the maximum symbol number of the packets comprises a maximum symbol number required for transmitting training fields, signal fields, and data fields of the two or more users.

16. The apparatus of claim 15, wherein the tail field is positioned within the last byte of the symbol to which the tail field belongs.

* * * * *